US012569754B2

(12) United States Patent
Kurabayashi

(10) Patent No.: US 12,569,754 B2
(45) Date of Patent: Mar. 10, 2026

(54) SERVER, GAME SYSTEM, AND PROCESSING METHOD

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 606 days.

(21) Appl. No.: 18/058,033

(22) Filed: Nov. 22, 2022

(65) Prior Publication Data

US 2023/0086992 A1 Mar. 23, 2023

Related U.S. Application Data

(63) Continuation of application No. PCT/JP2021/019526, filed on May 24, 2021.

(30) Foreign Application Priority Data

May 29, 2020 (JP) ................................. 2020-093992

(51) Int. Cl.
*A63F 13/352* (2014.01)

(52) U.S. Cl.
CPC ...... *A63F 13/352* (2014.09); *A63F 2300/513* (2013.01); *A63F 2300/534* (2013.01)

(58) Field of Classification Search
CPC .............. A63F 13/352; A63F 2300/513; A63F 2300/534; A63F 13/00; A63F 13/30; A63F 13/33; A63F 13/35; G06F 15/16
See application file for complete search history.

(56) References Cited

U.S. PATENT DOCUMENTS 8,732,236 B2 * 5/2014 Altmaier ................. H04L 67/14
709/203
9,233,304 B2 * 1/2016 Kurabayashi ........... A63F 13/35
(Continued)

FOREIGN PATENT DOCUMENTS

CN 101266633 A 9/2008
CN 107609895 A 1/2018
(Continued)

OTHER PUBLICATIONS

B. Kemme et al.; "Database Replication: a Tale of Research across Communities"; Proceedings of the VLDB Endowment, vol. 3, No. 1; Sep. 2010; pp. 5-12; (8 pages).
(Continued)

*Primary Examiner* — Justin L Myhr
*Assistant Examiner* — Ankit B Doshi
(74) *Attorney, Agent, or Firm* — Osha Bergman Watanabe & Burton LLP

(57) ABSTRACT

A server among various servers is included in a game system in which the servers are responsible for various respective areas in a game space and manage object information indicating a state of each of various objects movable among the areas. The server stores the object information, updates the object information of an object existing in the area for which the server is responsible, stores the MAC address of a target server, transmits to the target server by packet transfer based on data in the data link layer with the stored MAC address being set as a destination update information that indicates update content of the object information updated by the first update unit and time information indicating an in-game clock time at the time of the update, and updates the object information of an object existing outside the area for which the server is responsible.

6 Claims, 12 Drawing Sheets

(56) References Cited

U.S. PATENT DOCUMENTS

| | | | | |
|---|---|---|---|---|
| 9,330,154 | B2 * | 5/2016 | Di Vincenzo | ........... G06F 16/27 |
| 2003/0177187 | A1 | 9/2003 | Levine et al. | |
| 2004/0116186 | A1 | 6/2004 | Shim et al. | |
| 2010/0146082 | A1 * | 6/2010 | Isobe | ................. H04L 12/2861 |
| | | | | 709/219 |
| 2012/0290535 | A1 * | 11/2012 | Patel | ................... G06F 11/2094 |
| | | | | 707/634 |
| 2013/0054526 | A1 | 2/2013 | Di Vincenzo | |
| 2013/0253675 | A1 | 9/2013 | Kurabayashi et al. | |

FOREIGN PATENT DOCUMENTS

| | | |
|---|---|---|
| CN | 111124301 A | 5/2020 |
| CN | 114470746 A | 5/2022 |
| JP | 2013-208426 A | 10/2013 |
| JP | 2017-37445 A | 2/2017 |
| JP | 2017-037446 A | 2/2017 |
| KR | 20050079606 A | 8/2005 |

OTHER PUBLICATIONS

B. Kemme et al.; "A New Approach to Developing and Implementing Eager Database Replication Protocols"; ACM Transactions on Database Systems, vol. 25, No. 3; Sep. 2000; pp. 333-379; (47 pages).

J. Gascon-Samson et al.; "MultiPub: Latency and Cost-Aware Global-Scale Cloud Publish/Subscribe"; 2017 IEEE 37th International Conference on Distributed Computing Systems (ICDCS); Atlanta, Georgia; 2017; pp. 2075-2082 (8 pages).

C. Canas et al.; "Self-Evolving Subscriptions for Content-Based Publish/Subscribe Systems"; 2017 IEEE 37th International Conference on Distributed Computing Systems (ICDCS); Atlanta, Georgia; 2017; pp. 1597-1607 (11 pages).

C. Canas et al.; "Publish/Subscribe Network Designs for Multiplayer Games"; Proceedings of the 15th International Middleware Conference (Middleware '14), ACM; New York, New York, USA; 2014; pp. 241-252 (12 pages).

J. Holliday et al.; "The Performance of Database Replication with Group Multicast"; Digest of Papers; Twenty-Ninth Annual International Symposium on Fault-Tolerant Computing (Cat. No. 99CB36352); Madison, Wisconsin, USA; 1999; pp. 158-165 (8 pages).

T. Groothuyse et al.; "GlobeTP: Template-Based Database Replication for Scalable Web Applications"; Proceedings of the 16th international conference on World Wide Web (WWW '07); ACM; New York, New York, USA; 2007; pp. 301-310 (10 pages).

C. Maihofer; "A Survey of Geocast Routing Protocols"; IEEE Communications Surveys & Tutorials; vol. 6, No. 2; Second Quarter 2004; pp. 32-42 (11 pages).

R. Lottiaux et al.; "OpenMosix, OpenSSI and Kerrighed: A Comparative Study"; 2005 IEEE International Symposium on Cluster Computing and the Grid; INRIA; 2005; pp. 1016-1023 (8 pages).

C. Amza et al.; "TreadMarks: Shared Memory Computing on Networks of Workstations"; Computer; vol. 29, No. 2; Feb. 1996; pp. 18-28 (11 pages).

J. Ousterhout et al.; "The Case for RAMClouds: Scalable High-Performance Storage Entirely in DRAM"; ACM SIGOPS Operating Systems Review; vol. 43, No. 4; Jan. 2010; pp. 92-105 (14 pages).

H. Han et al.; "Cashing in on the Cache in the Cloud"; IEEE Transactions on Parallel and Distributed Systems; vol. 23, No. 8; Aug. 2012; pp. 1387-1399 (13 pages).

"Amazon VPC FAQs"; Retrieved from the Internet: URL: https://aws.amazon.com/jp/vpc/faqs/ (36 pages).

International Search Report issued in PCT/JP2021/019526 on Aug. 3, 2021 (2 pages).

Office Action issued in counterpart Chinese Patent Application No. 202180059375.3 mailed on Sep. 8, 2023 (7 pages).

B. Kemme et al.; "Database Replication"; Springer, Synthesis Lectures on Data Management #7, 2010 (146 pages).

S. Ahn et al.; "IT Convergence and Security"; Springer, Lecture Notes in Electrical Engineering, vol. 449, 2017 (361 pages).

* cited by examiner

GAME SPACE (TWO-DIMENSIONAL INFORMATION)          ONE AREA

FIG. 5

OBJECT INFORMATION

| OBJECT IDENTIFICATION INFORMATION | POSITION INFORMATION | | ORIENTATION INFORMATION | | |
| --- | --- | --- | --- | --- | --- |
| | | UPDATE TIMING (Tick-ID) | | UPDATE TIMING (Tick-ID) | |
| OP11287 | (X1,Y2) | T0013281 | D1° | T0013279 | · · · · |
| · · · · | · · · · | | · · · · | | · · · · |

FIG. 6

TARGET SERVER INFORMATION

| MAC ADDRESS |
| --- |
| 00:09:······ |
| ⋮ |

FIG. 7

SERVER INFORMATION

| AREA IDENTIFICATION INFORMATION | SERVER IDENTIFICATION INFORMATION | MAC ADDRESS |
| --- | --- | --- |
| A001 | S001 | 00:09:······ |
| ⋮ | ⋮ | ⋮ |

FIG. 8

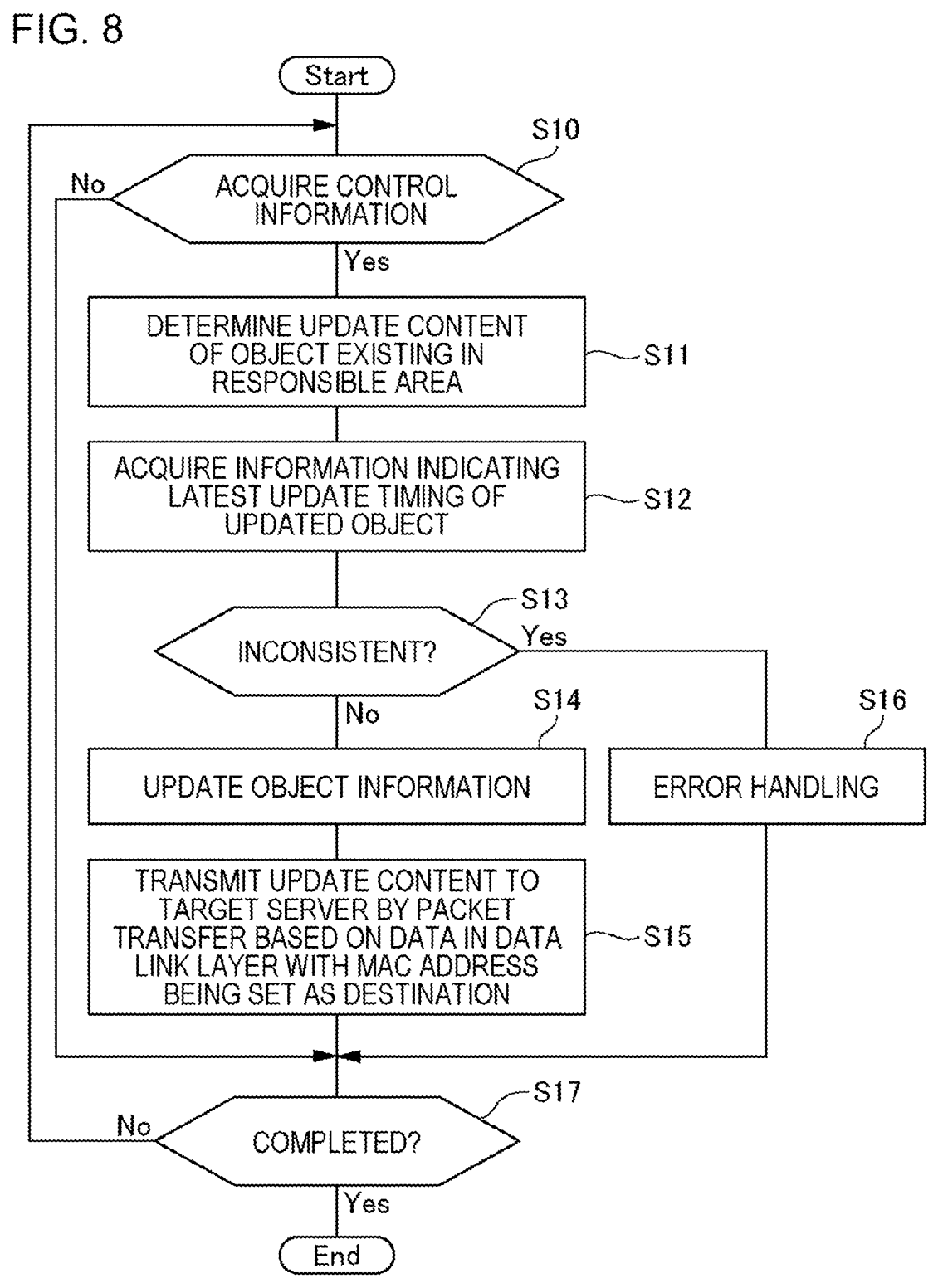

Start

S10
No — ACQUIRE CONTROL INFORMATION

Yes

DETERMINE UPDATE CONTENT OF OBJECT EXISTING IN RESPONSIBLE AREA — S11

ACQUIRE INFORMATION INDICATING LATEST UPDATE TIMING OF UPDATED OBJECT — S12

S13
INCONSISTENT? — Yes

No — S14

S16

UPDATE OBJECT INFORMATION

ERROR HANDLING

TRANSMIT UPDATE CONTENT TO TARGET SERVER BY PACKET TRANSFER BASED ON DATA IN DATA LINK LAYER WITH MAC ADDRESS BEING SET AS DESTINATION — S15

S17
No — COMPLETED?

Yes

End

FIG. 10

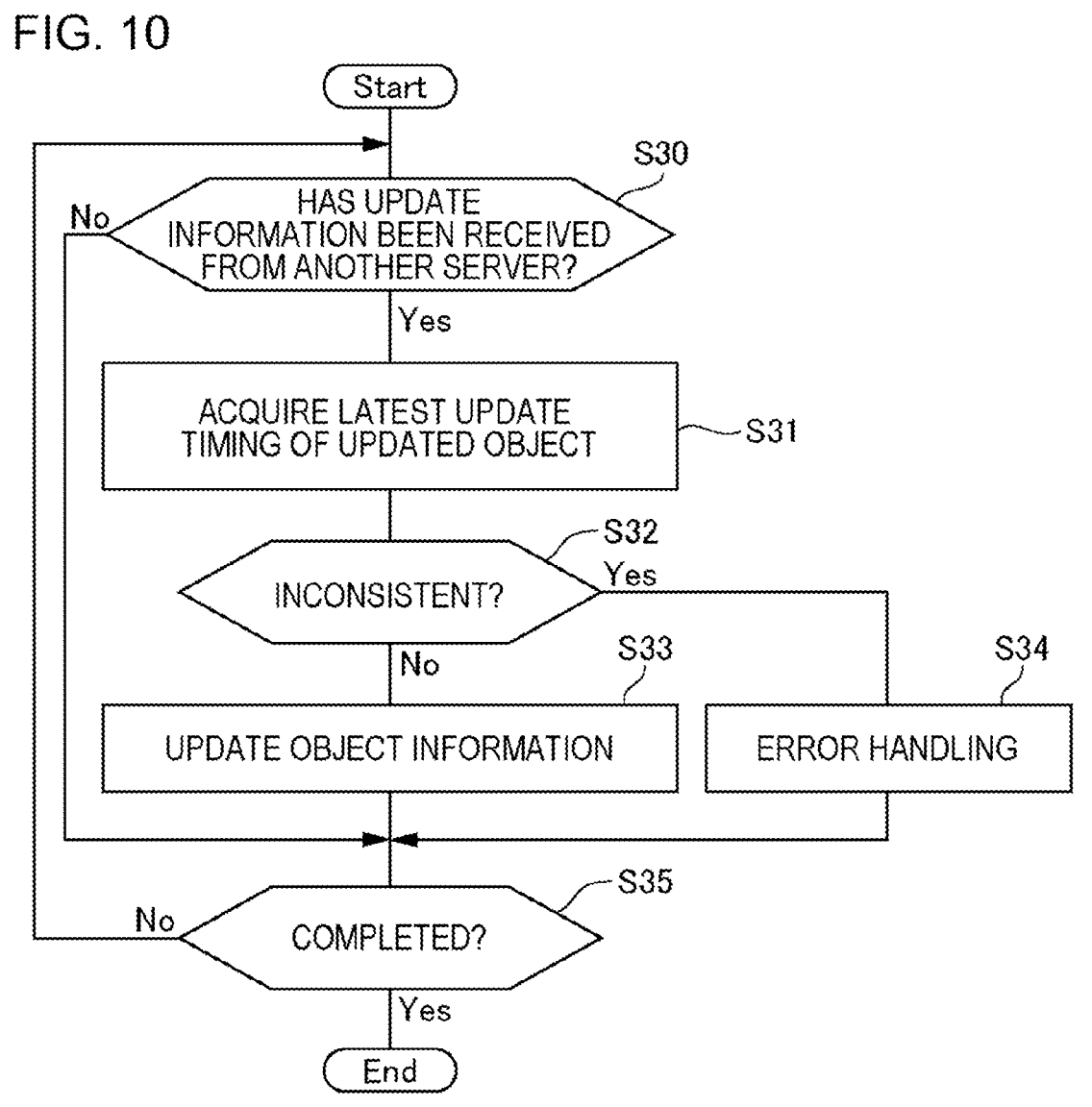

```
                    ( Start )
                        │
                        ▼
              ┌────────────────────────────┐ S30
         No   │   HAS UPDATE               │
      ◄───────│ INFORMATION BEEN RECEIVED  │
              │ FROM ANOTHER SERVER?       │
              └────────────────────────────┘
                        │
                       Yes
                        │
                        ▼
              ┌────────────────────────────┐
              │   ACQUIRE LATEST UPDATE     │  S31
              │ TIMING OF UPDATED OBJECT    │
              └────────────────────────────┘
                        │
                        ▼
                                          S32
              ┌────────────────────────────┐      Yes
              │      INCONSISTENT?          ├──────────┐
              └────────────────────────────┘          │
                        │                              │
                       No         S33                  │    S34
              ┌────────────────────────────┐   ┌───────────────────┐
              │  UPDATE OBJECT INFORMATION  │   │  ERROR HANDLING   │
              └────────────────────────────┘   └───────────────────┘
                        │                              │
                        ▼◄─────────────────────────────┘
                                          S35
         No   ┌────────────────────────────┐
      ◄───────│        COMPLETED?           │
              └────────────────────────────┘
                        │
                       Yes
                        │
                    (  End  )
```

FIG. 11

SERVER, GAME SYSTEM, AND PROCESSING METHOD

TECHNICAL FIELD

The present invention relates to servers, game systems, and processing methods.

BACKGROUND ART

If open-world games, which have become popular in recent years, can be offered as large-scale MMO (Massively Multiplayer Online) games, open-world games involving high development cost can yield profits on a long-term basis.

In an open-world MMO game, for example, the game space is divided into multiple areas, with each area corresponding to one load distribution unit. Also, because interactions, such as movement of objects (e.g., characters), battles between characters, item exchange, and magic invocation, may take place across load distribution units, synchronous processing between distributed in-memory databases is necessary.

The biggest challenge in realizing an in-memory database for such an open-world MMO game is to achieve an appropriate load distribution function by means of multiple nodes in a situation in which objects move freely across multiple areas.

In a situation in which objects move and act freely in an open world, there is a growing demand for a new synchronization method that automatically levels loads on the servers while allowing objects to act freely without setting restrictions on the range of object movement or the number of players that can simultaneously perform logins.

There have been many studies in the fields of data replication, data synchronization, and distributed databases, as disclosed in, for example, NPLs 1 to 3. In addition, as disclosed in NPLs 4 to 6, database load distribution and data synchronization for MMO games are considered as an evolved form of data replication technology, and research on such database load distribution and data synchronization has been actively conducted in North America and Canada. However, these types of research are based on a method in which areas and objects in a game are labeled so that data is distributed and those labels are subscribed to in the form of a Publish/Subscribe model, and do not assume a situation in which an unspecified large number of open-world objects update data in real time while sharing a single virtual space.

Furthermore, a data replication method utilizing IP (internet protocol) multicast has been studied, as disclosed in NPL 7, and a related patent application has also been filed, as disclosed in PTL 1. However, it is difficult to implement IP multicast in a flexible manner. In particular, it is difficult to achieve the flexibility and efficiency required by data replication, and no further advanced research has been conducted.

Although data replication methods that utilize geographic relationships are provided, as disclosed in NPL 8 and NPL 9, no data replication methods that utilize game-specific virtual space information are known. In addition, in the field of distributed shared memory, particularly software-based distributed shared memory that can be flexibly used in a public cloud, research, such as Kerrighed, openMosix, and OpenSSI, and an OSS project have been launched, as disclosed in NPLs 10 and 11. However, these projects went dormant in the mid-2000s and have not been widely utilized.

In recent years, schemes for transparently realizing remote memory access at the kernel level have also been studied, as disclosed in NPL 12. However, these studies are mainly intended for large-scale scientific and technical computations, and applications such as games, in which memory access patterns change significantly depending on the content situation, have not yet been studied. At present, shared memories in the cloud are being actively researched, as disclosed in NPLs 13 and 14, but applications thereof to games have not been considered and remain a general-purpose use case.

CITATION LIST

Patent Literature

{PTL 1}
U.S. Pat. No. 9,330,154B2

Non Patent Literature

{NPL 1}
B. Kemme, R. Jimenez-Peris, and M. Patino-Martinez, "Database Replication," Vol. 2, No. 1, pp. 1-153, 2010., DOI: https://doi.org/10.2200/S00296ED1V01Y201008DTM007
{NPL 2}
B. Kemme and G. Alonso, "Database replication: a tale of research across communities," Proc. VLDB Endow. 3, 1-2, pp. 5-12, September 2010., DOI: http://dx.doi.org/10.14778/1920841.1920847
{NPL 3}
B. Kemme and G. Alonso, "A new approach to developing and implementing eager database replication protocols.," ACM Trans. Database Syst. 25, pp. 333-379, 3 Sep. 2000., DOI: https://doi.org/10.1145/363951.363955
{NPL 4}
J. Gascon-Samson, J. Kienzle, and B. Kemme, "MultiPub: Latency and Cost-Aware Global-Scale Cloud Publish/Subscribe," 2017 IEEE 37th International Conference on Distributed Computing Systems (ICDCS), Atlanta, Ga., pp. 2075-2082, 2017., doi: 10.1109/ICDCS.2017.203
{NPL 5}
C. Canas, K. Zhang, B. Kemme, J. Kienzle, and H. A. Jacobsen, "Self-Evolving Subscriptions for Content-Based Publish/Subscribe Systems," 2017 IEEE 37th International Conference on Distributed Computing Systems (ICDCS), Atlanta, Ga., pp. 1597-1607, 2017., doi: 10.1109/ICDCS.2017.277
{NPL 6}
C. Canas, K. Zhang, B. Kemme, J. Kienzle, and H. A. Jacobsen, "Publish/subscribe network designs for multiplayer games," In Proceedings of the 15th International Middleware Conference (Middleware '14), ACM, New York, N.Y., USA, pp. 241-252, 2014., DOI: https://doi.org/10.1145/2663165.2663337
{NPL 7}
J. Holliday, D. Agrawal, A. E. Abbadi, "The performance of database replication with group multicast," Digest of Papers. Twenty-Ninth Annual International Symposium on Fault-Tolerant Computing (Cat. No. 99CB36352), Madison, Wis., USA, pp. 158-165, 1999., doi: 10.1109/FTCS.1999.781046
{NPL 8}
T. Groothuyse, S. Sivasubramanian, and G. Pierre, "GlobeTP: template-based database replication for scalable web applications," In Proceedings of the 16th international conference on World Wide Web (WWW '07), ACM, New York, N.Y., USA, pp. 301-310, 2007., DOI: https://doi.org/10.1145/1242572.1242614

{NPL 9}

C. Maihofer, "A survey of geocast routing protocols," in IEEE Communications Surveys & Tutorials, vol. 6, no. 2, pp. 32-42, Second Quarter 2004., doi: 10. 1109/COMST.2004.5342238

{NPL 10}

R. Lottiaux, B. Boissinot, P. Gallard, G. Vallee, and C. Morin, "OpenMosix, OpenSSI and Kerrighed: A Comparative Study," [Research Report] RR-5399, INRIA, p. 20, 2004.

{NPL 11}

C. Amza et al., "TreadMarks: shared memory computing on networks of workstations," in Computer, vol. 29, no. 2, pp. 18-28, February 1996., doi: 10.1109/2.485843.

{NPL 12}

S. Ahn, E. Lim, W. Choi, S. Kang, H. Kim, "A Design of Kernel-Level Remote Memory Extension System," In IT Convergence and Security 2017, LNEE, vol 449, 2018., https://doi.org/10.1007/978-981-10-6451-7_13

{NPL 13}

J. Ousterhout, P. Agrawal, D. Erickson, C. Kozyrakis, J. Leverich, D. Mazieres, S. Mitra, A. Narayanan, G. Parulkar, M. Rosenblum, S. M. Rumble, E. Stratmann, and R. Stutsman, "The case for RAMClouds: scalable high-performance storage entirely in DRA," SIGOPS Oper. Syst. Rev. 43, 4 (January 2010), pp. 92-105, 2010., DOI: https://doi.org/10.1145/1713254.1713276

{NPL 14}

H. Han, Y. C. Lee, W. Shin, H. Jung, H. Y. Yeom and A. Y. Zomaya, "Cashing in on the Cache in the Cloud," in IEEE Transactions on Parallel and Distributed Systems, vol. 23, no. 8, pp. 1387-1399, August 2012., doi: 10.1109/TPDS.2011.297

{NPL 15}

"Amazon VPC FAQs", https://aws.amazon.com/jp/vpc/faqs/

SUMMARY OF INVENTION

Technical Problem

The present invention addresses the problem of providing a new data synchronization method appropriate for game systems.

Solution to Problem

The present invention provides a server of a plurality of servers included in a game system in which the plurality of servers are responsible for a plurality of respective areas in a game space and manage object information indicating a state of each of a plurality of objects movable among the areas, said server including:

an object information storage unit for storing the object information;

a first update unit for updating, of the object information stored in the object information storage unit, the object information of the object existing in the area for which said server is responsible;

a MAC address storage unit for storing the MAC (media access control) address of a target server, which is one of the plurality of servers;

a first transmission unit for transmitting, to the target server by packet transfer based on data in the data link layer with the MAC address stored in the MAC address storage unit being set as a destination, update information that indicates update content of the object information updated by the first update unit and time information indicating an in-game clock time at the time of the update; and a second update unit that updates, of the object information stored in the object information storage unit, the object information of the object existing outside the area for which said server is responsible on the basis of the update information received from another of the servers and that realizes a time-sequential update of the object information on the basis of the time information.

In addition, the present invention provides a game system including a plurality of the above-described servers.

In addition, the present invention provides a processing method executed by a server of a plurality of servers included in a game system in which the plurality of servers are responsible for a plurality of respective areas in a game space and manage object information indicating a state of each of a plurality of objects movable among the areas, said processing method including:

a step of storing the object information and the MAC address of a target server, which is one of the plurality of servers;

a first update step of updating, of the stored object information, the object information of the object existing in the area for which said server is responsible;

a first transmission step of transmitting, to the target server by packet transfer based on data in the data link layer with the MAC address being set as a destination, update information that indicates update content of the object information updated in the first update step and time information indicating an in-game clock time at the time of the update; and a second update step of updating, of the stored object information, the object information of the object existing outside the area for which said server is responsible on the basis of the update information received from another of the servers and realizing a time-sequential update of the object information on the basis of the time information.

Advantageous Effects of Invention

According to the present invention, it is possible to provide a new data synchronization method appropriate for game systems.

BRIEF DESCRIPTION OF DRAWINGS

FIG. 5 is a diagram for schematically showing an example of information processed by the server according to this embodiment.

FIG. 6 is a diagram for schematically showing an example of information processed by the server according to this embodiment.

FIG. 7 is a diagram for schematically showing an example of information processed by the server according to this embodiment.

FIG. 8 is a flowchart for illustrating an example of a flow of processing executed by the server according to this embodiment.

FIG. 10 is a flowchart for illustrating an example of a flow of processing executed by the server according to this embodiment.

FIG. 11 is a diagram for illustrating the server according to this embodiment.

DESCRIPTION OF EMBODIMENTS

Technical Idea

Figure 1:
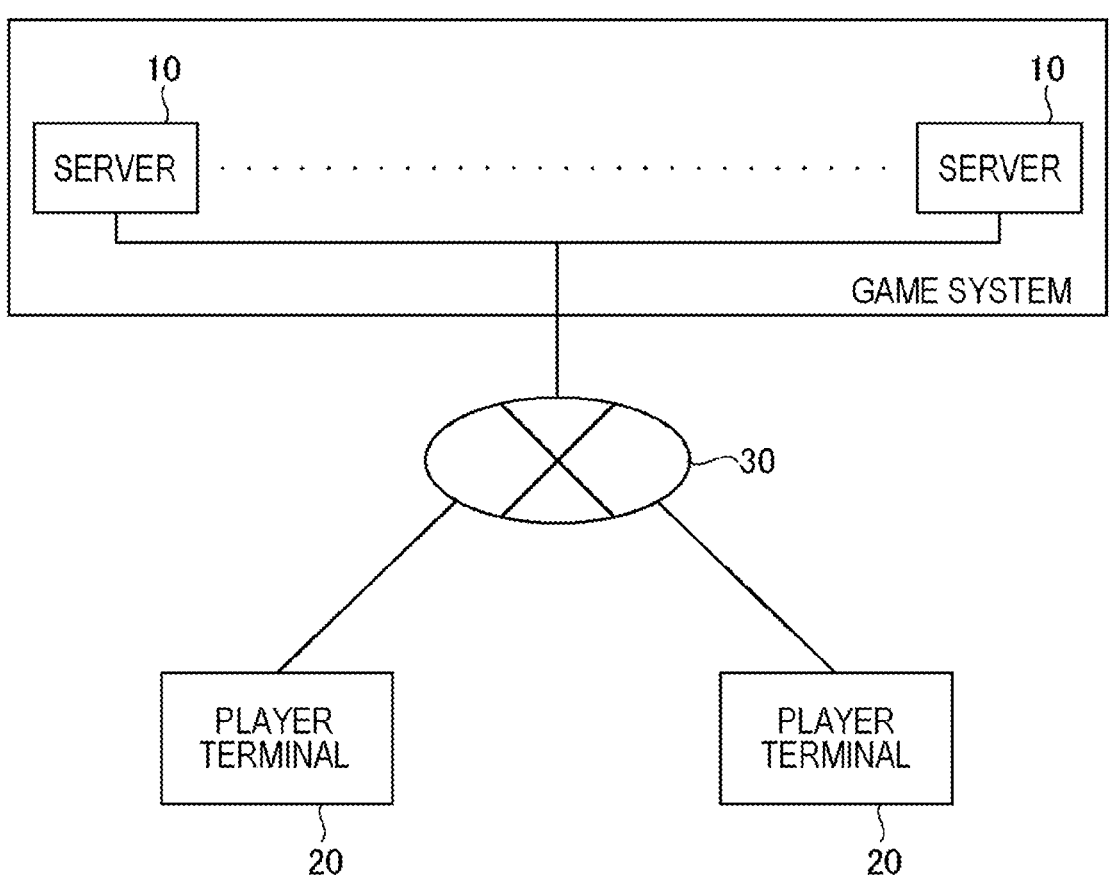
FIG. 1 is a diagram for illustrating the overall view of a game system according to this embodiment.

First, the technical idea of a game system according to this embodiment will be described. The purpose of this embodiment is to achieve large-scale load distribution such that game state information managed by each server can be appropriately synchronized among servers in, for example, open-world MMO games, which do not have explicit server division units. To this end, this embodiment employs a method in which servers responsible for geographically close areas in a virtual game space are connected by means of direct communication between the OS (operating system) kernels without the intervention of an application, thereby highly efficiently managing the state information on a distributed shared memory.

More specifically, in this embodiment, the game space is divided into a plurality of areas, and a server responsible for each of the areas is determined. Also, in order to increase the speed of communication between servers responsible for two respective areas in which an object frequently moves from one area to the other, pseudo-IP multicast processing using the kernel of the OS running on each of the servers is introduced. This scheme is based on the capability of presetting a packet transfer filter of the kernel so that any group of nodes, if known in advance to have a high frequency of object movement, automatically receive the same packet. With this capability, between two servers responsible for their respective areas in which an object highly frequently moves from one area to the other, object update information can be immediately transmitted and received (synchronized) at high speed in a push-type manner by using inter-kernel communication, that is, without copying packet data from a memory region managed by the OS kernel to a memory region managed by an individual application or without context switching for transferring the CPU execution authority from the kernel to the application. With this configuration, a pseudo-IP multicast network structure completely matching game map information can be built statically.

Here, a "pseudo-IP multicast network structure" will be described. A pseudo-IP multicast network structure can be built by performing packet transfer setting (registration of a destination MAC address) on the kernel. In this pseudo-IP multicast network structure, servers each having another server's MAC address registered as a destination MAC address are directly connected. Between directly connected servers, data can be transmitted and received such that the kernel of each node constituting the distributed shared memory is made to serve as a router by using a pseudo-multicast function.

By causing the kernel of each node on the distributed shared memory to serve as a router, this embodiment performs routing of a write command through high-efficiency inter-kernel communication and performs consistency control by means of Tick-IDs, without requiring a centrally controlled router or high-level routing processing in the application layer. Thus, this embodiment is characterized by realizing a function for transmitting a predetermined packet to an appropriate receiver with a standard kernel function alone, that is, without using a dedicated network device, such as a router, or application-specific packet transmission/reception processing.

Note that when synchronization is necessary between servers in which the above-described inter-kernel communication is not performed (between servers not directly connected by means of a pseudo-IP multicast network structure), it is possible to transmit and receive (synchronize) update information in a pull-type manner when necessary by employing, for example, conventional application-level IP communication.

In addition, because this embodiment utilizes pseudo-IP multicast using the packet transfer filter of the kernel, the destination to be synchronized with the server can be flexibly changed without having to change a network setting. It is also possible for one server to accept synchronization from a plurality of servers.

In general, it is extremely important to manage integrity and consistency between pushed data items in push-type synchronization, and memory update/read operations are serialized by using game-specific time information (Tick-IDs, etc.) in this embodiment. For this reason, distributed processing can be performed without causing a problem with data integrity, which has been a challenge with conventional distributed databases. Therefore, for game uses, this embodiment in most cases can behave as an in-memory database that operates lock-free.

Outline of Processing

Next, an outline of the processing executed by the game system according to this embodiment will be described. The game system according to this embodiment has a plurality of servers. Also, the plurality of servers are responsible for a plurality of respective areas in the game space. Each of the servers updates, on the basis of control information generated with a player input or in the current device, object information (corresponding to the above-described state information) of an object existing in the area for which the current server is responsible.

Also, the plurality of servers execute processing for synchronizing object information managed by the servers. Between two servers responsible for their respective areas in which an object frequently moves from one area to the other, push-type synchronization is executed through pseudo-IP multicast processing by using the OS kernels.

In push-type synchronization, the OS of each of the servers transmits, without a request from another server, update information to a pre-registered target server by packet transfer that is based on data in the data link layer (L2) with the MAC address of the target server being set as a destination. With such processing, immediate and high-speed synchronization can be realized. A target server is at least one of the plurality of servers. A server specified as a target server is determined for each of the servers. If an object in the area for which each of the servers is responsible is frequently transmitted to and received from the area for which a certain server is responsible, the certain server is set as a target server of each of the servers.

In push-type synchronization, it is assumed that, for example, all data items received by a server are copied to a predetermined group of servers at all times. This is referred to as replication. As a modification, in push-type synchronization, packets, instead of sequentially being copied, may be copied after being buffered for a certain time period.

Note that when synchronization becomes necessary between servers in which push-type synchronization is not executed, conventional application-layer communication, such as IP communication, can be employed to transmit and receive update information in a pull-type manner when necessary (pull-type synchronization). For example, a server that is not set as a target server of a first server and thus does not execute push-type synchronization with the first server requests update information from the first server as needed. Push-type synchronization means that a server that has received a packet actively transfers the packet to another server. Pull-type synchronization allows a server to acquire information when necessary by requesting the information from another server, thereby eventually achieving synchronization.

In pull-type synchronization, an application running on each of the servers transmits, in response to a request from another server, update information to the other server by, for example, IP communication. Only applications, which can recognize a situation where data is needed, can generate a request. For this reason, pull-type synchronization consequently requires processing in the application layer. Note that communication that needs processing in the application layer normally takes a longer time to transmit and receive data per byte because it not only causes data exchange, etc. between different layers but also requires context switching. For this reason, pull-type synchronization is slower than push-type synchronization. In pull-type synchronization, only update content may be transmitted and received, or only content specified upon request may be transmitted and received.

Thus, in this embodiment, servers experiencing high-frequency exchange of an object between their respective areas for which the servers are responsible are directly connected by means of a pseudo-IP multicast network structure (each other's MAC address is registered as a destination in the packet transfer setting on the kernel), whereby immediate and high-speed synchronization is performed in push-type synchronization. By setting push-type synchronization on the basis of the geographic relationships in the virtual space, it is possible to suppress the load on the CPU and the network due to push-type synchronization to a low level while retaining a high rate of data sharing resulting from the push-type synchronization.

In addition, in this embodiment, time information such as Tick-IDs is included in the update information to be transmitted and received between servers. Also, memory update/read operations are serialized by using this time information. This makes it possible to manage the integrity and consistency across data items.

Overall Configuration of Game System

Next, the overall configuration of the game system according to this embodiment will be described. As shown in FIG. 1, the game system has a plurality of servers 10.

The plurality of servers 10 are located on the same network or on the same virtual network in a cloud and are configured to be capable of transmitting/receiving data to/from one another by packet transfer on the basis of addresses (MAC addresses) in the data link layer. For example, the plurality of servers 10 can exist on the same virtual network (e.g., subnets generated by logically dividing a virtual network server). Such a configuration of the plurality of servers 10 can be realized by using the technologies disclosed in, for example, NPL 15.

The plurality of servers 10 are connected to a plurality of player terminals 20 via the Internet 30. The player terminals 20 are terminals to be operated by players and include, but are not limited to, for example, smartphones, tablet terminals, PCs (personal computers), mobile phones, and game terminals.

Configuration of Server 10

Next, the configuration of a server 10 will be described. First, the hardware configuration of the server 10 will be described. Each functional unit provided in the server 10 according to this embodiment is realized by an arbitrary combination of hardware and software, which mainly involves a CPU (Central Processing Unit) of an arbitrary computer, a memory, programs loaded into the memory, a storage unit such as a hard disk that stores the programs (which can store, in addition to the programs already stored before the shipping of the device, programs loaded from a storage medium such as a CD (Compact Disc) or downloaded from a server on the Internet or the like), and a network connection interface. Furthermore, it will be understood by a person skilled in the art that there are various modifications concerning methods and devices for realizing the functional units.

Figure 2:
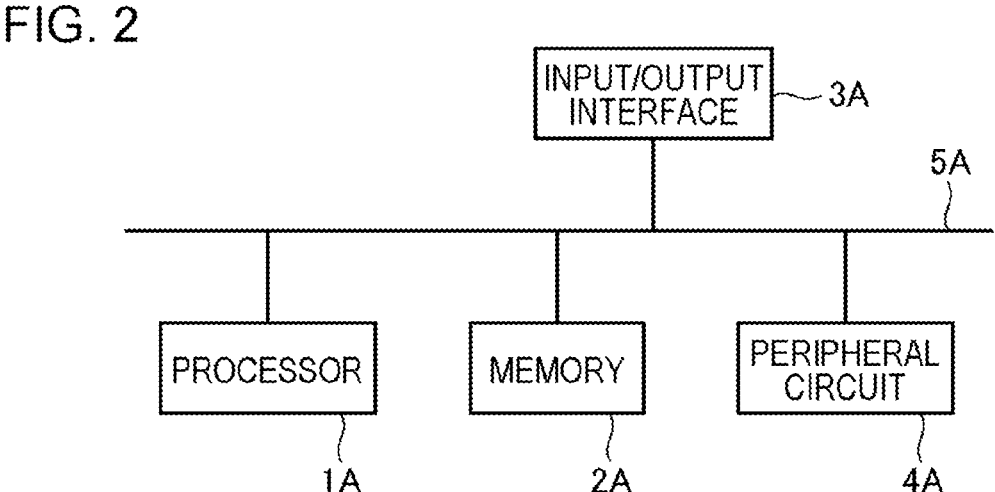
FIG. 2 is a diagram showing an example of the hardware configuration of a server according to this embodiment.

FIG. 2 is a block diagram showing an example of the hardware configuration of the server 10 according to this embodiment. As shown in FIG. 2, the server 10 includes a processor 1A, a memory 2A, an input/output interface 3A, a peripheral circuit 4A, and a bus 5A. The peripheral circuit 4A includes various modules. The server 10 need not include the peripheral circuit 4A.

Note that the server 10 may be configured from a plurality of physically and/or logically separated devices. In other words, one server 10 may be configured as a cluster composed of a plurality of devices. In this case, each of the devices may be provided with the hardware configuration described above. Alternatively, the server 10 may be configured from a physically and logically single device.

The bus 5A is a data transmission path that allows the processor 1A, the memory 2A, the peripheral circuit 4A, and the input/output interface 3A to transmit data to and receive data from each other. The processor 1A is a computational processing device, such as a CPU or a GPU (Graphics Processing Unit). The memory 2A is a memory such as a RAM (Random Access Memory) or a ROM (Read Only Memory). The input/output interface 3A includes interfaces for obtaining information from an input device, an external device, an external server, an external sensor, etc., as well as interfaces for outputting information to an output device, an external device, an external server, etc. The input device is, for example, a keyboard, a mouse, or a microphone. The output device is, for example, a display, a speaker, a printer, or a mailer. The processor 1A is capable of issuing instructions to the individual modules and performing computations on the basis of the results of computations by the modules.

Figure 3:
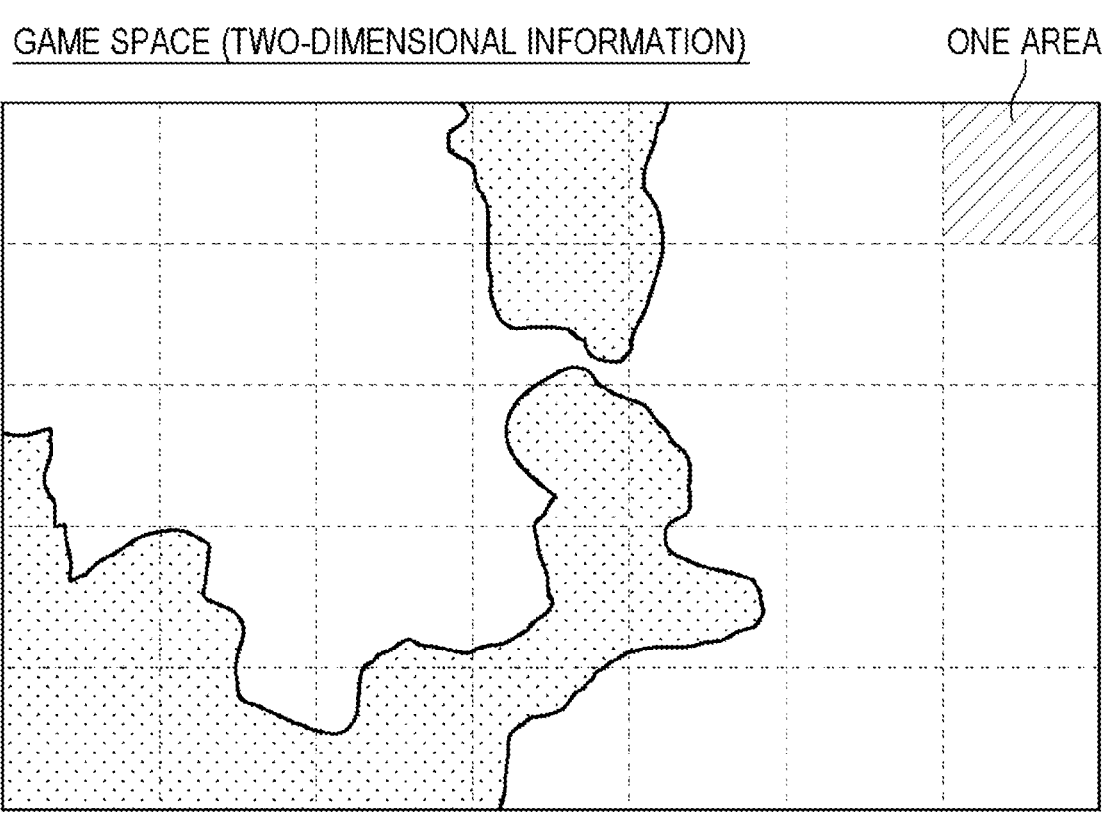
FIG. 3 is a diagram for illustrating functions of the server according to this embodiment.

Next, the functional configuration of the server 10 will be described. The game provided by the game system according to this embodiment is, for example, an open-world MMO game. As shown in FIG. 3, the game space is separated into a plurality of areas. Objects existing in the game space can move from one area to another (i.e., can move over areas). Objects include player objects controlled by players and non-player objects not controlled by players. Objects include every object, such as a character, a bow, a bullet, a bird. The servers 10 are responsible for a plurality of respective areas.

Here, the concept of being "responsible for an area" will be described. The server 10 responsible for a first area among the plurality of areas stores object information indicating the state of an object existing in the first area and updates that object information on the basis of control information generated with a player input or control information determined in the current device. Then, the server 10 responsible for the first area transmits, to another server 10, update information indicating update content regarding the object information of the object existing in the first area. In this manner, the server 10 responsible for the first area updates, by processing as described above, object information of the object existing in the area for which the server 10 is responsible and transmits the update content of the object to another server 10.

As will become clear in the following explanation, the server 10 responsible for the first area stores and updates not only the object information of an object existing in the first area but also the object information of objects existing outside the area for which the server 10 is responsible. For example, in the case where an object is frequently exchanged between the first area and the area for which another server 10 is responsible, upon receiving, from the other server 10 by push-type synchronization, object information of an object that exists in the area for which the other server 10 is responsible, the server 10 responsible for the first area stores and updates the received object information. In addition, for example, upon receiving, from the server 10 that is responsible for another area by pull-type synchronization, object information of an object that exists in the area for which the server 10 is responsible, the server 10 responsible for the first area stores and updates the received object information.

However, a method for updating object information of an object existing in the area for which a server is responsible differs from a method for updating object information of an object existing outside the area for which the server is responsible. More specifically, the method for updating object information of an object existing in the area for which the server is responsible is as described above. On the other hand, object information of an object existing outside the area for which the server is responsible is updated on the basis of update information received from another server 10 by push-type or pull-type synchronization. In addition, even though updating object information of an object existing outside the area for which the server 10 is responsible, the server 10 does not transmit, to another server 10, update information indicating the update content. Also in this respect, an object existing in the area for which the server 10 is responsible is treated differently from an object existing in another area.

Figure 4:
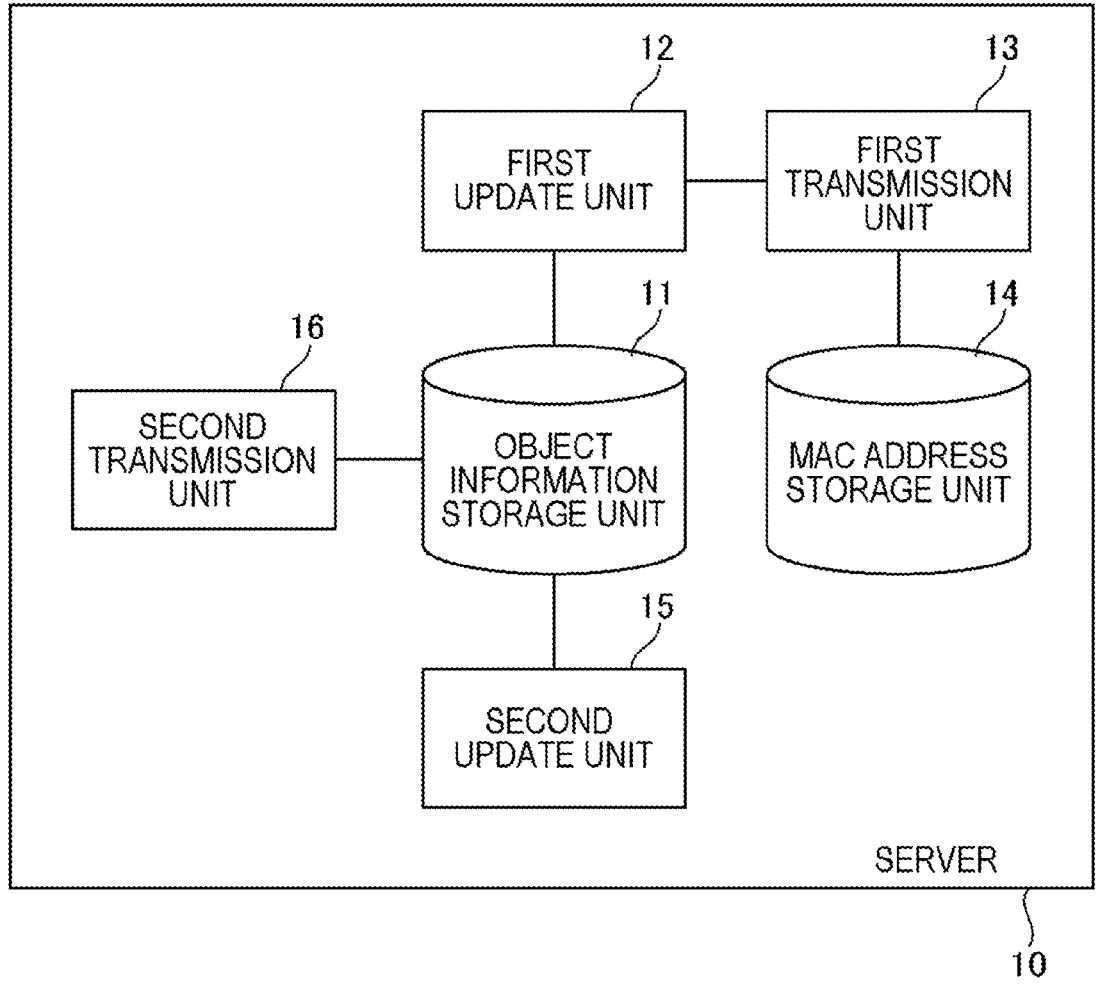
FIG. 4 is a diagram showing an example of a functional block of the server according to this embodiment.

FIG. 4 shows an example of a functional block diagram of the server 10. As illustrated, the server 10 has: an object information storage unit 11; a first update unit 12; a first transmission unit 13; a MAC address storage unit 14; a second update unit 15; and a second transmission unit 16.

The object information storage unit 11 stores object information indicating the states of objects existing in the game space. The object information includes all information, such as position information indicating the position of an object in the game space, orientation information indicating the orientation of the object, hit points, attacking power, defending power, level, etc.

The object information storage unit 11 of each of the servers 10 stores object information of some of the plurality of objects existing in the game space. The object information storage unit 11 stores object information of an object existing in the area for which the current server 10 is responsible.

Here, the "current server 10" will be described. First, the functional units (object information storage unit 11, first update unit 12, first transmission unit 13, MAC address storage unit 14, second update unit 15, and second transmission unit 16) realized in the first server 10, which is one of the plurality of servers 10, are defined as first functional units. In this case, the first server 10 is the "current server 10" for the first functional units. Also, the servers 10 other than the first server 10 are "other servers 10" to the first functional units.

An explanation of the configuration of the object information storage unit 11 will resume. The object information storage unit 11 can also store object information of objects existing outside the area for which the current server 10 is responsible. More specifically, the object information storage unit 11 stores object information received from another server 10 by synchronous processing. In other words, the object information storage unit 11 stores object information received by push-type synchronous processing from another server 10 directly connected to the current server 10 by means of a pseudo-IP multicast network structure. In addition, the object information storage unit 11 stores object information received by, for example, pull-type synchronous processing from another server 10 that is not directly connected to the current server 10 by means of a pseudo-IP multicast network structure.

FIG. 5 schematically shows an example of object information. As illustrated, object information can further include information indicating the update timing of each parameter. The update timing is indicated by, for example, time information indicating an in-game clock time. A Tick-ID is an example of time information indicating an in-game clock time. Hereinafter, it is assumed that a Tick-ID is time information indicating an in-game clock time. Note that a method in which update timing is managed object by object may be employed, instead of a method in which update timing is managed parameter by parameter.

Here, a Tick-ID will be described. A Tick-ID is generated in each of the plurality of servers 10 by the same processing. The servers 10 update the Tick-ID at intervals of a predetermined time. A Tick-ID is denoted in, for example, digits, and each of the servers 10 increases the Tick-ID by a predetermined amount (e.g., "1") at intervals of a predetermined time. The cycle at which the Tick-ID is updated is, for example, 0.03 to 0.05 seconds (about 20 Hz to 30 Hz). The plurality of servers 10 are synchronized to generate, at the same timing, Tick-IDs having the same value by arbitrary means such as a method in which the NTP (network time protocol) is used or a method in which atomic clocks are provided in all servers 10.

Referring back to FIG. 4, the first update unit 12 updates, of the object information stored in the object information storage unit 11, object information of an object existing in the area for which the current server 10 is responsible.

For example, the first update unit 12 receives, from the player terminal 20, control information concerning a player object existing in the area for which the current server 10 is responsible and updates the object information of that player object on the basis of that control information. Control information concerning the player object is generated on the basis of a player input performed via, for example, the player terminal 20. Control information may be information indicating the content of a player input (data indicating touch positions time-sequentially, data indicating a magnitude and a direction calculated on the basis of the relevant data, etc.) or may be information indicating control content (amount and direction of movement of the player object, the position to which the player object has moved, etc.) determined by the player terminal 20 on the basis of the content of the player input.

In addition, for example, the first update unit 12 determines control content of a non-player object existing in the area for which the current server 10 is responsible and updates object information of that non-player object. An algorithm for determining control content of a non-player object is a design matter.

The first update unit 12 for updating object information by processing as described above updates object information of only an object existing in the area for which the current server 10 is responsible and does not update object information of the objects existing outside the area for which the current server 10 is responsible.

The first update unit 12 realizes time-sequential updates of object information on the basis of Tick-IDs. For example, when updating a predetermined parameter of object information of a predetermined object, the first update unit 12 first refers to the object information stored in the object information storage unit 11 (refer to FIG. 5) and identifies the Tick-ID of the latest update timing of that parameter. Then, if the Tick-ID of the latest update timing temporally precedes the Tick-ID of the current update timing (Tick-ID at the present time), there is no problem, and the first update unit 12 thus executes update processing. On the other hand, if the Tick-ID of the latest update timing temporally follows the Tick-ID of the current update timing (Tick-ID at the present time), there is a problem, and the first update unit 12 thus does not execute update processing. In this case, the first update unit 12 executes error handling.

The MAC address storage unit 14 stores the MAC addresses of target servers, which are some of the plurality of servers 10. FIG. 6 schematically shows an example of target server information stored in the MAC address storage unit 14. The content of the target server information differs from one server 10 to another. In short, servers 10 serving as target servers differ from one server 10 to another.

For example, the MAC address storage unit 14 stores the MAC address of a server 10 if the area for which that server 10 is responsible has a predetermined geographic relationship with the area for which the current server 10 is responsible. In other words, the server 10 that is responsible for an area satisfying predetermined conditions on a geographic relationship with the area for which the current server 10 is responsible becomes a target server of the current server 10. The predetermined conditions include, but are not limited to, the following conditions: "the shortest time required for an object to move from one area to the other is smaller than or equal to a reference value"; "the areas are adjacent to each other"; "the areas are adjacent to each other and there are no obstacles for interrupting movement between the areas in a boundary region of the areas"; "the shortest distance between the areas is within the moving distance of any object (object other than a character, such as a bow, arrow, bombshell, etc.); and "an object can move between the areas without passing through a third area on the game (e.g., movement between adjacent areas by walking, etc., movement between areas that are distant from each other by warping, etc.)".

Target server information as shown in FIG. 6 is generated by an operator who manages the game system. For example, the operator may generate target server information, as shown in FIG. 6, by inputting the MAC address of a target server for each of the servers 10.

In addition, each of the servers 10 may store server information, as shown in FIG. 7, related to other servers 10. In the server information, server identification information of each of the other servers 10, the MAC address of each of the other servers 10, and identification information of the area for which each of the other servers 10 is responsible are tied to one another. In this case, the operator may input, for each of the servers 10, server identification information of a server 10 serving as a target server. Also, each of the servers 10 may acquire, from the server information, the MAC address tied to the input server identification information and register the MAC address in the target server information. Furthermore, the operator may input, for each of the servers 10, area identification information of the area for which a server 10 serving as a target server is responsible. Also, each of the servers 10 may acquire, from the server information, the MAC address tied to the input area identification information and register the MAC address in the target server information.

Note that the MAC address of a target server is registered in the MAC address storage unit 14 by, for example, registering the MAC address of a packet transmission destination by means of the network traffic control function (filtering setting) provided by the kernel of the OS installed in the server 10.

Without a request from a target server, the first transmission unit 13 transmits, to the target server, update information indicating update content of object information by means of the first update unit 12, by packet transfer based on data (MAC address, etc.) in the data link layer, with the MAC address stored in the MAC address storage unit 14 being set as a destination. In response to the update of object information executed by the first update unit 12, the first transmission unit 13 can transmit, to the target server, update information indicating the update content. The time lag (elapsed time) from the update timing to the transmission of the update information should preferably be as small as possible.

The update information includes information indicating the update timing (Tick-ID at the time of update).

Note that the above-described transmission of update information to some servers 10 (target servers) using data (MAC address, etc.) in the data link layer is realized by, for example, the packet filtering function in the network traffic control function of the OS.

On the basis of update information received from another server 10 in push-type synchronization or pull-type synchronization, the second update unit 15 updates, of the object information stored in the object information storage unit 11, object information of an object existing outside the area for which the current server 10 is responsible (in areas for which the current server 10 is not responsible).

The second update unit 15 for updating object information by processing as described above updates object information of only an object existing outside the area for which the current server 10 is responsible and does not update object information of an object existing in the area for which the current server 10 is responsible.

The second update unit 15 realizes time-sequential updates of object information on the basis of Tick-IDs. For example, when updating a predetermined parameter of object information of a predetermined object, the second update unit 15 first refers to the object information stored in the object information storage unit 11 (refer to FIG. 5) and identifies the Tick-ID of the latest update timing of that parameter. Then, if the Tick-ID of the latest update timing temporally precedes the Tick-ID included in the update information (Tick-ID at the time update was executed by another server 10), there is no problem, and the second update unit 15 thus executes update processing. On the other hand, if the Tick-ID of the latest update timing temporally follows the Tick-ID included in the update information (Tick-ID at the time update was executed by another server 10), there is a problem, and the second update unit 15 thus does not execute update processing. In this case, the second update unit 15 executes error handling.

For example, when update information is transmitted and received in push-type synchronization, the second update unit 15 serializes update/read operations on the basis of the Tick-IDs tied to the update/read operations (determines the order of update/read operations). Then, if the problem of a data conflict occurs after the order has been determined, the second update unit 15 notifies the game logic of an exception. The data conflict is resolved at the game logic side, for example, by a method for assigning priorities for each player, a method for evading the conflict state by using an effect, or the like (processing of the game logic is a design matter). The problem of a data conflict occurs, for example, if a read operation from a memory block address and a write operation to the same memory block address are executed with the same Tick-ID or two or more write operations are executed on the same memory block address with the same Tick-ID.

Referring back to FIG. 4, in response to a request from another server 10, the second transmission unit 16 transmits, to the other server 10, object information stored in the object information storage unit 11 by IP communication. The second transmission unit 16 can transmit, to the other server 10, object information including the update timing of each parameter. For IP communication, the protocol in the network layer is the IP protocol, and the protocol in the transport layer is the TCP (Transmission Control Protocol), the UDP (User Datagram Protocol), or the like.

The request from the other server 10 may include information for specifying an object. Also, the second transmission unit 16 may transmit, of the object information stored in the object information storage unit 11, object information of a specified object to the other server 10.

Next, an example of the flow of processing executed by the server 10 will be described.

First, an example of the flow of "processing for updating object information of an object existing in the area for which the current server 10 is responsible and transmitting the update information to a target server" will be described by using the flowchart in FIG. 8.

The first update unit 12 waits for acquiring control information regarding an object existing in the area for which the current server 10 is responsible (S10). For example, the first update unit 12 can receive, from the player terminal 20, control information concerning a player object existing in the area for which the current server 10 is responsible. In addition, the first update unit 12 can acquire control information concerning a non-player object that has been generated in the current server 10 and that exists in the area for which the current server 10 is responsible.

Upon acquiring control information (Yes in S10), the first update unit 12 determines update content of the object on the basis of the control information (S11). For example, in the case where the control information indicates the moving direction or the moving distance of the object, the first update unit 12 determines a new position of that object on the basis of the current position of that object and the relevant control information. Note that details of processing for determining the update content based on the control information are design matters and are not limited to the example here.

Thereafter, the first update unit 12 refers to the object information stored in the object information storage unit 11 (refer to FIG. 5) and acquires a Tick-ID indicating the latest update timing of the parameter to be updated for the object to be updated (S12). Then, the first update unit 12 compares the Tick-ID indicating the latest update timing with the Tick-ID of the current update timing (Tick-ID at the present time) (S13).

If no inconsistency occurs as a result of the Tick-ID of the latest update timing temporally preceding the Tick-ID of the current update timing (No in S13), the first update unit 12 updates the object information stored in the object information storage unit 11 on the basis of the update content determined in S11 (S14). At this time, the first update unit 12 updates, with the Tick-ID indicating the current update timing, the information indicating the update timing tied to the updated parameter of the updated object.

Subsequently, according to the update in S14, the first transmission unit 13 transmits, to a target server without a request from the target server, update information indicating the update content of object information in S14, by packet transfer based on data in the data link layer with all MAC addresses stored in the MAC address storage unit 14 being set as destinations (S15).

On the other hand, if there is inconsistency as a result of the Tick-ID of the latest update timing temporally following the Tick-ID of the current update timing (Yes in S13), the first update unit 12 executes error handling instead of updating the object information on the basis of the update content determined in S11 (S16).

Subsequently, the server 10 repeats the same processing.

Figure 9:
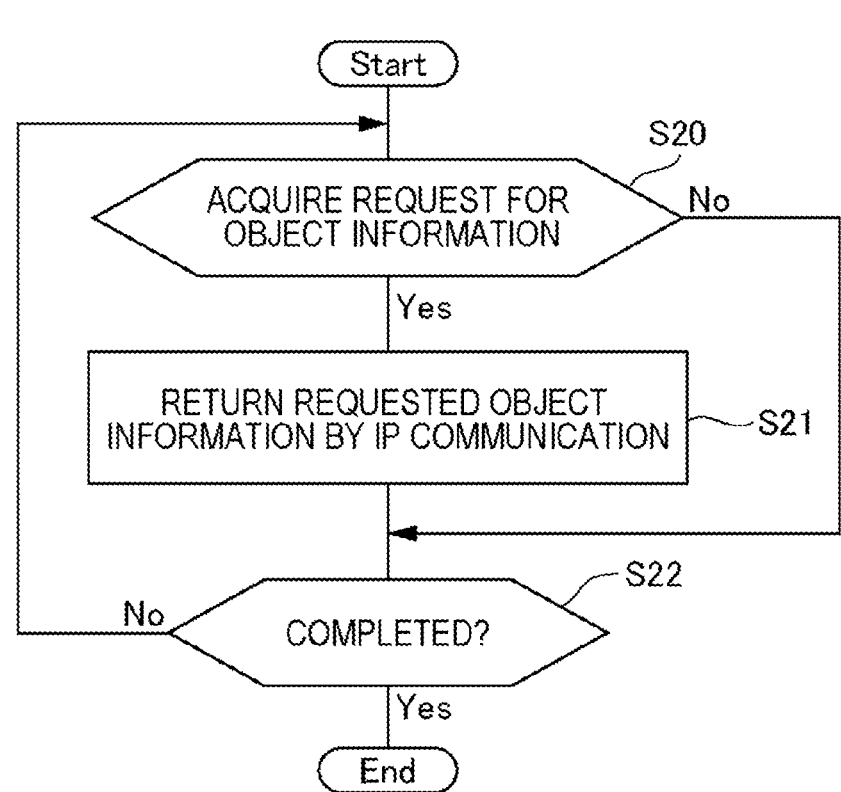
FIG. 9 is a flowchart for illustrating an example of a flow of processing executed by the server according to this embodiment.

Next, an example of the flow of "processing for transmitting object information to another server 10 upon a request from the other server 10" will be described by using the flowchart in FIG. 9.

The second transmission unit 16 waits for a request from another server 10 (S20). Then, upon receiving a request for object information from another server 10 (Yes in S20), the second transmission unit 16 transmits, to the other server 10, object information stored in the object information storage unit 11 by IP communication (S21).

A request from another server 10 may include information for specifying an object. Also, of the object information stored in the object information storage unit 11, the second transmission unit 16 may transmit object information of the specified object to the other server 10.

Subsequently, the server 10 repeats the same processing.

Next, an example of the flow of "processing for updating object information of an object existing outside the area for which the current server 10 is responsible in reaction to acquisition of update information from another server 10" will be described by using the flowchart in FIG. 10.

The second update unit 15 waits for receiving update information from another server 10 (S30). Then, upon receiving update information from another server 10 (Yes in S30), the second update unit 15 refers to the object information stored in the object information storage unit 11 (refer to FIG. 5) and acquires a Tick-ID indicating the latest update timing of the parameter to be updated for the object to be updated (S31). Then, the second update unit 15 compares the Tick-ID indicating the latest update timing with the Tick-ID of the update timing included in the update information (Tick-ID at the time update was executed by the other server 10) (S32).

If no inconsistency occurs as a result of the Tick-ID of the latest update timing temporally preceding the Tick-ID of the update timing included in the update information (No in S32), the second update unit 15 updates the object information stored in the object information storage unit 11 on the basis of the update content indicated by the received update information (S33). At this time, the second update unit 15 updates, with the Tick-ID that is included in the update information and that indicates the update timing, the information indicating the update timing tied to the updated parameter of the updated object.

On the other hand, if there is inconsistency as a result of the Tick-ID of the latest update timing temporally following the Tick-ID of the update timing included in the update information (Yes in S32), the second update unit 15 executes error handling instead of updating the object information on the basis of the update content indicated by the received update information (S34).

Subsequently, the server 10 repeats the same processing.

Example

Next, an example for more specifically realizing the server 10 according to this embodiment will be described. Note that this example is just an example for realizing the above-described embodiment, and means for realizing this embodiment is not limited to this example.

In order to reduce the frequency of memory access to a remote node on a conventional distributed shared memory, it is necessary to frequently synchronize updated memory content among nodes. This has resulted in a communication traffic of $N^2$ when there are N nodes. As a constraint specific to MMO applications, this example employs a mesh structure in the virtual space as a data synchronization range, thereby realizing practically needed data synchronization in a synchronization range that only requires a much smaller traffic than $N^2$.

Figure 11:
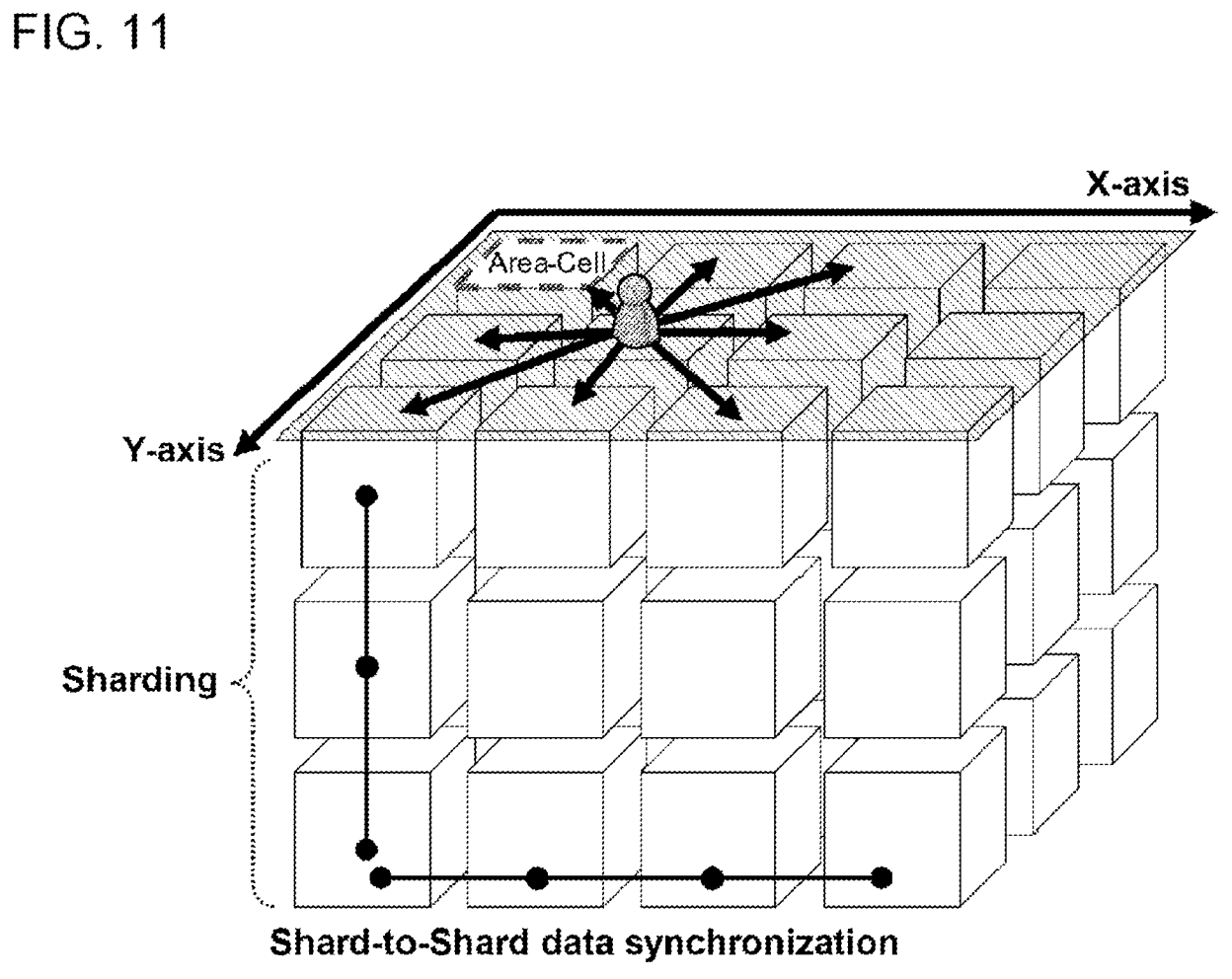

FIG. 11 shows the overall view of synchronization among servers 10 according to this example. In this example, the game space is divided into a plurality of areas, so that each of the servers 10 is responsible for a corresponding area. Also, in this example, the above-described push-type synchronization is executed among a plurality of servers 10 responsible for respective areas, for example, close to one another. Note that the above-described push-type synchronization is not executed among a plurality of servers 10 responsible for respective areas that are not close to one another. Because of this, a substantially uniform distributed database can be built without having to synchronize the content of all servers 10.

In addition, although not explained in the above embodiment, each area may be sharded and replicated to distribute the load in this example. The distribution unit of shards may be per player, per object, or the like. If the distribution unit of shards is per player as an example, the information concerning the same player managed by a plurality of servers 10 is stored in the same shard. For example, because all shards share a hash function to be applied to player IDs, shards close to one another on the same tier store information concerning the same player. For this reason, it is only necessary to perform synchronization processing among shards on the same tier, and the processing burden on the servers 10 is reduced.

In addition, this example can eliminate a problem with the transaction isolation levels by controlling the execution order and consistency of all data update/reference operations by means of Tick-IDs. In other words, the shared memory can be treated as a database in which all operations can be serialized and all areas can be referenced in a flat manner.

This example is based on a function for enabling practical multicast by performing packet transfer setting on the kernel at each node (EC2 instance) of AWS (refer to NPL 15), thereby realizing a "router-function-embedded DSM (Distributed Shared Memory)", wherein the kernel of each node on the distributed shared memory is allowed to serve as a router. By doing so, when a pseudo-IP multicast network structure completely matching the game map information is statically built in the cloud, super-high-efficiency data replication and data synchronization are possible merely by IP multicast, as long as game Tick-IDs are included in packets.

Figure 12:
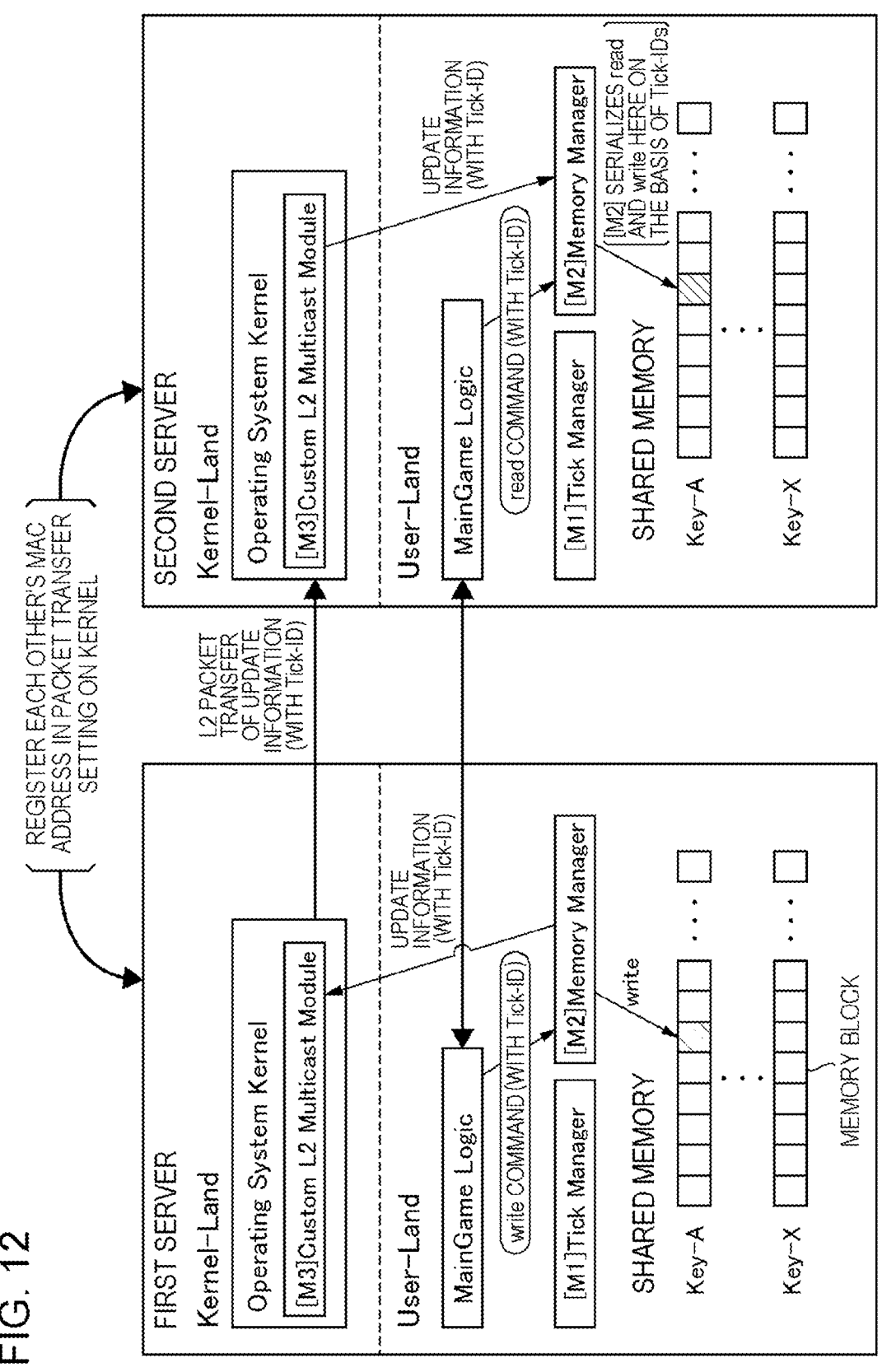
FIG. 12 is a diagram for illustrating the server according to this embodiment.

FIG. 12 shows a system configuration diagram of this example. This system is configured not to seamlessly provide a completely linear address space across all servers 10 but to automatically synchronize, among the servers 10, a variable identifiable with a character string, as shown by "Key-A" in the figure. In short, with "key-name" being considered as a variable, this system can be viewed as having a scheme for providing a variable (memory block) to be shared among the plurality of servers 10. In this respect, this system greatly differs from existing distributed shared memories.

This example is configured from three modules that can be implemented in a single node (server 10) in a closed manner.

[M1] Tick Manager, which is a first module, is a module for managing a Tick-ID, serving as the time unit of the game, and is in principle synchronized with the real time. This synchronization can be easily implemented by using an existing stable implementation, such as the NTP (Network Time Protocol).

[M2] Memory Manager, which is a second module, is a module for managing the distributed shared memory by providing the APIs described below to the logic on the server 10 side. Memory manager serializes memory update/read operations using Tick-IDs. If Memory manager detects a data conflict using Tick-IDs, the game logic side is notified of an exception. The data conflict is resolved at the game logic side, for example, by a method for assigning priorities for each player, a method for evading the conflict state by using an effect, or the like (processing of the game logic is a design matter). The problem of a data conflict occurs, for example, if operations (read/write) are performed on the same memory block address with the same Tick-ID.

[M3] Custom L2 Multicast Module is a third module and, most importantly, runs inside the kernel. This module registers the MAC address of each other's server as a multicast destination, thereby forming a network structure for packet transfer in the data link layer (pseudo-IP multicast network structure). This network structure corresponds to a proximity relationship among areas (areas for which the servers 10 are responsible) in the game virtual space, so that servers 10 geographically close to each other are connected, and servers 10 geographically far away from each other are not connected. In this example, among servers 10 connected in this manner, writing to the shared memory is immediately shared through L2 packet transfer.

This L2 packet transfer is described below in detail. Many of the virtual routers constituting a public cloud do not support IP multicast and cannot achieve multicast merely by network setting (refer to NPL 15). For this reason, it has been considered that using multicast in cloud services is difficult.

However, in cloud services, management information, such as the MAC address of each node, can be obtained dynamically from the cloud management system without relying on routers. Thus, nodes in the cloud can know the node structure of the entire cloud. Therefore, pseudo-multicast can be implemented in the cloud by processing multicast packets at each node and multicasting the packets individually. In this example, this is referred to as pseudo-IP multicast.

Furthermore, in this pseudo-IP multicast, the transmission destination of a packet can be changed merely by packet filter setting in the network traffic control function provided by the OS kernel. Therefore, multicast processing can be flexibly changed. In distributed processing of conventional in-memory databases, only applications can have a positional relationship in the virtual space, which is application-specific information, so it has not been possible to use this positional relationship in the virtual space for optimization processing in the OS layer. This example can be implemented highly efficiently in the data link layer by focusing on simple information propagation in the form of data synchronization/data replication.

The APIs provided in this example are described below. The APIs constituting this system include five core APIs and four subsidiary APIs.

$$\text{chain([MAC\_ADDRESS1,MAC\_ADDRESS2,}$$
$$\text{MAC\_ADDRESS3, . . . MAC\_ADDRESS}n]) \qquad (1)$$

The chain API performs setting of packet transfer from the server 10 in which this API has been started to the servers 10 having MAC_ADDRESS1 to MAC_ADDRESSn. As a result, merely by transmitting a multicast packet to this server 10, the packet can be transferred to the servers 10 having MAC_ADDRESS1 to MAC_ADDRESSn through L2 packet processing alone. In this system, memory writing via a smart pointer generated with the open API, which will be described below, is immediately shared through L2 packet transfer among the servers 10 connected with this chain.

$$\text{open("key-name(e.g. /root/world1/cell-id)",}$$
$$\text{[READ\_ONLY,WRITE\_ONLY,RW])}\rightarrow\text{sptr} \qquad (2)$$

The open API generates a reference to the shared memory. Here, sptr, which is a return value of the function, stands for Smart Pointer to Distributed Shared Memory and is an object for managing a reference to the shared memory. For key-name, any ASCII character string not including a blank space can be specified. The ASCII character string does not necessarily include a directory delimiter, such as "/", as in the example above. It is not desirable to unnecessarily restrict the packet size, and it is preferable to add a restriction, such as up to 255 characters. If the memory block bound to "key-name" does not exist, an exception occurs.

Figure 13:
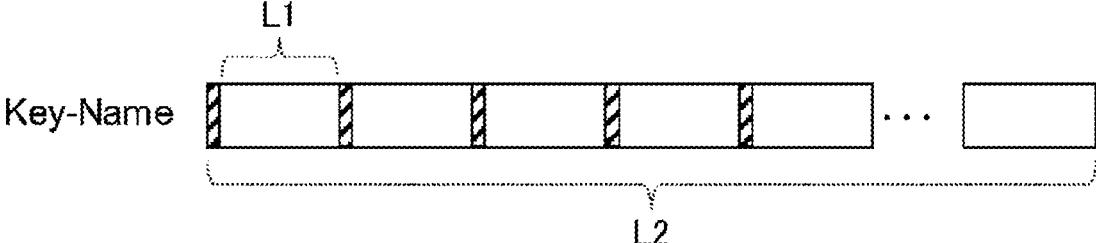
FIG. 13 is a diagram for illustrating the server according to this embodiment.

FIG. 13 shows a schematic diagram of memory blocks provided in this example. Each memory block (object) is assigned a Tick-ID at which the information currently stored in the memory block was generated/updated. The size L1 of an object stored in the shared memory should preferably be a fixed length. The size of the entire shared memory, L2, should also be sufficiently reserved at the time of system startup and should be a fixed length. Although L2 can be made variable by using a linked list, etc., doing so is not desirable because random access performance will be degraded. The shared memory is modeled, for example, as an array of fixed-length objects and is identified by name.

$$\text{(write)sptr}[i]=a \qquad (3)$$

This is an API for writing to the shared memory. The written memory segment is immediately replicated on the server 10 side. At this time, Tick-IDs, which are in-game clock times when the states of objects were generated, are recorded in the objects indicated as a, and this system uses the Tick-IDs for writing to serialize the write operations when writing to the memory block.

This enables lock-free execution of parallel writing to the memory. When operations are performed on the same memory block address (indicated by i in the above-described example) with the same Tick-ID, this system notifies the game logic of an exception. The data conflict is resolved at the game logic side, for example, by a method for assigning priorities for each player, a method for evading the conflict state by using an effect, or the like. The size of variable a should preferably be determined statically. However, the size of variable a can be processed completely dynamically by cleverly devising the write logic.

$$a=\text{sptr}[i] \qquad (4)$$

This is an API for reading from the shared memory. In the same manner as when writing is performed, if the Tick-ID stored in block[i] is not earlier than the Tick-ID possessed by variable a as a result of the Tick-ID possessed by variable a being compared with the Tick-ID stored in block[i], a data conflict occurs. Hence, this system notifies the game logic of an exception. This exception processing is implemented by the =operator of variable a.

$$\text{replicate("key-name",index,blocks)} \qquad (5)$$

When the kernel receives a multicast L2 packet, this replicate API is called. This API writes blocks over the addresses subsequent to index in the memory block bound to particular key-name. The parameter blocks is a string of bytes representing one or more objects. Because this system assumes the use of computers of the same architecture and does not include pointers or the like in the shared memory, objects are stored as is in the memory without any special serialization/deserialization processing. If the memory block bound to "key-name" does not exist, an illegal condition occurs. Hence, this condition is treated as a serious error.

This example uses, as main APIs: (1) chain API for setting pseudo-IP multicast using the packet transfer filter of the kernel; (2) open API for generating a reference to a shared memory block; (3) write API; (4) read API; and (5) replicate API that is called when data to be replicated has arrived as a multicast packet. In this example, the main functions are substantially implemented by these five APIs. APIs (6) to (9) listed below are APIs that are necessary for implementation but do not provide essential functions of this example.

$$\text{close(sptr)} \qquad (6)$$

This API closes a reference to the distributed shared memory. The reference is performed with a smart pointer and disappears if it goes out of scope. Thus, the close API basically need not be called.

$$\text{create("key-name",size)} \qquad (7)$$

The create API allocates a block of the size indicated by size in the distributed shared memory, with the name "key-name". The memory segment allocation command is immediately replicated on the server 10 side and is processed on another server 10 as a create API call. If a memory block bound to "key-name" already exists, an exception occurs.

$$\text{delete("key-name")} \qquad (8)$$

The delete API deletes the block having the "key-name" name in the distributed shared memory. The memory segment delete command is immediately replicated on the server 10 side and is processed on another server 10 as a delete API call. If the memory block bound to "key-name" does not exist, an exception occurs.

$$\text{resize("key-name",size)} \qquad (9)$$

The resize API expands, by the size indicated by size, the block allocated with the "key-name" name in the distributed shared memory. The memory segment resize command is immediately replicated on the server 10 side and is processed on another server 10 as a resize API call. If the memory block bound to "key-name" does not exist, an exception occurs. If the specified size is smaller than the size of the already allocated memory block, the memory block is reduced. However, it is not preferable to dynamically reduce the memory size.

By implementing the above-described APIs, this example can be implemented in any server 10 having a Tick management function. Furthermore, if object-oriented wrapper libraries that can be used more conveniently are implemented in the upper layer of this example, a developer on the server 10 can implement the game logic as if there were a huge, fast key-value store on the network.

Note that, on AWS, a method for using the packet filtering function of the Linux® kernel with the tc (Traffic Control) command, copying the same number of multicast packets as the number of destinations, and transmitting the packets by replacing the MAC addresses with unicast can be used to implement this example. With this method, packets are captured in the data link layer, the same number of captured packets as the number of destinations are copied, and the captured packets are unicast to the destinations. The MAC address of a destination can be acquired with the AWS SDK, and an arbitrary group of MAC addresses can be acquired by using an instance name and a tag.

Effects

As described above, in the game system according to this embodiment, servers experiencing high-frequency exchange of an object between their respective areas for which the servers are responsible are directly connected by means of a pseudo-IP multicast network structure (each other's MAC address is registered as a destination in the packet transfer setting on the kernel), whereby immediate and high-speed synchronization is performed in push-type synchronization. By setting push-type synchronization on the basis of the geographic relationships in the virtual space, it is possible to suppress the load on the CPU and the network due to push-type synchronization to a low level while retaining a high rate of data sharing (a concept close to the so-called cache hit rate) resulting from push-type synchronization.

In addition, in this embodiment, time information is included in the update information to be transmitted and received between servers. Also, memory update/read operations are serialized by using this time information. This allows the integrity and consistency between data items to be managed.

In addition, in the game system according to this embodiment, time information is included in the update information to be transmitted and received between servers 10. Also, memory update/read operations are serialized by using this time information. This allows the integrity and consistency between data items to be managed.

In addition, as described in the example, a data synchronization path between kernels in this embodiment can be implemented merely by describing a shell script using the tc command of Linux®. Therefore, the work cost required to introduce this embodiment is very low.

In addition, the game system according to this embodiment realizes load distribution in a game system having game content of a high degree of freedom without restricting the behavior of players and is applicable to not only open-world MMO games but also various games that provide players with a high degree of freedom, such as FPS (First Person Shooter) games. In other words, the game system according to this embodiment is highly convenient.

In addition, the game system according to this embodiment can be implemented in an existing cloud without installing a proprietary virtual machine or router. This can reduce the cost burden. Also, the hurdle for implementation can be lowered.

Furthermore, the game system according to this embodiment can achieve load distribution without impairing the user experience. The game system according to this embodiment is a network communication acceleration technology that is implemented in a completely closed form within the cloud, without affecting the gameplay, and can achieve load distribution without any forced restrictions on the player. This advantage is extremely useful for games of genres such as open-world MMO games, where maintaining a sense of immersion in the game world is inherently important to the user experience. In existing schemes, load distribution has been achieved by methods unrelated to in-game rules, such as explicitly encouraging users to move to another world, disabling login due to congestion, or forcing users to log out.

Furthermore, the game system according to this embodiment can dramatically increase interaction among players in the game more than before. By applying the game system according to this embodiment, whichever server 10 accesses whichever storage server, the server 10 can acquire the same world information. Therefore, the game system according to this embodiment can increase the amount of user interaction that can be processed in a single area more than games with conventional load distribution techniques. More specifically, it is possible to provide scalable game services, irrespective of more complicated combat and an increased amount of action in MMO games.

In addition, the game system according to this embodiment is also applicable as a load distribution technology for non-open world MMO games. The game system according to this embodiment, even in a MMO game having multiple divided worlds, is applicable as a technology for achieving load distribution within a single world. Therefore, the game system according to this embodiment is also effective as a load distribution technology for existing MMO games. Furthermore, the game system according to this embodiment is applicable to a wide variety of games that involve player interaction and provide users with a high degree of freedom, such as FPS games and Second Life-type communication services.

Examples of reference modes are appended below.

1. A server of a plurality of servers included in a game system in which the plurality of servers are responsible for a plurality of respective areas in a game space and manage object information indicating a state of each of a plurality of objects movable among the areas, said server including:

an object information storage unit for storing the object information;

a first update unit for updating, of the object information stored in the object information storage unit, the object information of the object existing in the area for which said server is responsible;

a MAC address storage unit for storing the MAC (media access control) address of a target server, which is one of the plurality of servers;

a first transmission unit for transmitting, to the target server by packet transfer based on data in the data link layer with the MAC address stored in the MAC address storage unit being set as a destination, update information that indicates update content of the object information updated by the first update unit and time information indicating an in-game clock time at the time of the update; and a second update unit that updates, of the object information stored in the object information storage unit, the object information of the object existing outside the area for which said server is responsible on the basis of the update information received from another of the servers and that realizes a time-sequential update of the object information on the basis of the time information.

2. The server according to 1, wherein the time information is generated by each of the plurality of servers through the same processing.

3. The server according to 1 or 2, further including a second transmission unit for transmitting, to another of the server, the object information stored in the object information storage unit by IP (internet protocol) communication in response to a request from the other server.

4. The server according to any one of 1 to 3, wherein the MAC address storage unit stores the MAC address of the server responsible for the area in which a geographic relationship with the area for which a current server is responsible satisfies a predetermined condition.

5. The server according to any one of 1 to 4, wherein the MAC address storage unit stores the MAC address of a packet transmission destination set with a network traffic control function provided by a kernel of an OS (operating system) installed in the server, and transmission of the update information to the target server by means of the first transmission unit is realized by the network traffic control function of the OS.

6. A game system including a plurality of the servers according to any one of 1 to 5.

7. A processing method executed by a server of a plurality of servers included in a game system in which the plurality of servers are responsible for a plurality of respective areas in a game space and manage object information indicating a state of each of a plurality of objects movable among the areas, said processing method including:

a step of storing the object information and the MAC address of a target server, which is one of the plurality of servers;

a first update step of updating, of the stored object information, the object information of the object existing in the area for which said server is responsible;

a first transmission step of transmitting, to the target server by packet transfer based on data in the data link layer with the MAC address being set as a destination, update information that indicates update content of the object information updated in the first update step and time information indicating an in-game clock time at the time of the update; and a second update step of updating, of the stored object information, the object information of the object existing outside the area for which said server is responsible on the basis of the update information received from another of the servers and realizing a time-sequential update of the object information on the basis of the time information.

This application claims the right of priority based on Japanese Patent Application No. 2020-093992 filed on 29 May 2020, and incorporates the entire disclosure thereof herein.

REFERENCE SIGNS LIST

1A Processor
2A Memory
3A Input/output interface
4A Peripheral circuit
5A Bus
10 Server
11 Object information storage unit
12 First update unit
13 First transmission unit
14 MAC address storage unit
15 Second update unit
16 Second transmission unit
20 Player terminal
30 Internet

The invention claimed is:

1. A server comprising:

a processor; and a memory comprising a program that, when executed by the processor, is configured to perform a method comprising:

storing first object information of an object existing in a first area among a plurality of areas of a game space, wherein the object is moveable among the plurality of areas, wherein the first object information is managed by the server and indicates a state of the object, and wherein the server is among a plurality of servers that are disposed in a game system in which the plurality of servers are responsible for respective areas among the plurality of areas in the game space;

updating the first object information to produce update information;

storage unit for storing a first MAC (media access control) address of a first server among the plurality of servers;

transmitting, to the first server by packet transfer based on data in a data link layer with the first MAC address being set as a destination, the update information, wherein the update information indicates update content of the first object information and time information indicating an in-game clock time at a time of updating the first object information; and updating second object information of a second object existing outside the first area for which said server is responsible based on the update information received from another server of the plurality of servers, wherein updating the second object information realizes a time-sequential update of the second object information based on the time information.

2. The server according to claim 1, wherein the method further comprises transmitting, to a second server among the plurality of servers, the first object information by IP (internet protocol) communication in response to a request from the second server.

3. The server according to claim 1, wherein the first MAC address stored in the server is responsible for the first area in which a geographic relationship with a second area for which a second server is responsible satisfies a predetermined condition.

4. The server according to claim 1, wherein the method further comprises:

storage unit stores storing a MAC address of a packet transmission destination set with a network traffic control function that is provided by a kernel of an OS (operating system) installed in the server, and wherein transmitting the update information to the first server is performed by the network traffic control function of the OS.

5. A game system comprising the plurality of servers according to claim 1.

6. A processing method comprising:

storing, by a first server, first object information of an object existing in a first area among a plurality of areas of a game space, wherein the object is moveable among the plurality of areas, wherein the first object information is managed by the first server and indicates a state of the object, and wherein the first server is among a plurality of servers that are disposed in a game system in which the plurality of servers are responsible for respective areas among the plurality of areas in the game space;

updating, by the first server, the first object information to produce update information;

storing, by the first server, a first MAC (media access control) address of a second server among the plurality of servers;

transmitting, by the first server and to the second server by packet transfer based on data in a data link layer with the first MAC address being set as a destination, the update information, wherein the update information indicates update content of the first object information and time information indicating an in-game clock time at a time of updating the first object information; and updating, by the first server, second object information of a second object existing outside the first area for which the first server is responsible based on the update information received from another server of the plurality of servers, wherein updating the second object information realizes a time-sequential update of the second object information based on the time information.

* * * * *